United States Patent
Lyons et al.

(10) Patent No.: US 9,037,843 B2
(45) Date of Patent: May 19, 2015

(54) MANAGING A TARGET COMPUTING DEVICE

(75) Inventors: Peter Lyons, Louisville, CO (US); Bernard Sanders, Portland, OR (US)

(73) Assignee: Hewlett-Packard Development, L.P., Houston, TX (US)

( * ) Notice: Subject to any disclaimer, the term of this patent is extended or adjusted under 35 U.S.C. 154(b) by 616 days.

(21) Appl. No.: 12/721,133

(22) Filed: Mar. 10, 2010

(65) Prior Publication Data

US 2011/0225405 A1   Sep. 15, 2011

(51) Int. Cl.
| G06F 9/00 | (2006.01) |
| G06F 15/177 | (2006.01) |
| G06F 9/44 | (2006.01) |
| G06F 9/455 | (2006.01) |

(52) U.S. Cl.
CPC ............ *G06F 9/4445* (2013.01); *G06F 9/4401* (2013.01); *G06F 9/4406* (2013.01); *G06F 9/45512* (2013.01)

(58) Field of Classification Search
USPC ........................................................ 713/1, 2
See application file for complete search history.

(56) References Cited

U.S. PATENT DOCUMENTS

| 5,948,101 | A * | 9/1999 | David et al. ........................ 713/2 |
| 6,463,531 | B1 * | 10/2002 | Aguilar et al. ..................... 713/2 |
| 2002/0124245 | A1 * | 9/2002 | Maddux et al. ................ 717/176 |
| 2003/0195995 | A1 * | 10/2003 | Tabbara ......................... 709/313 |
| 2006/0242395 | A1 * | 10/2006 | Fausak ............................... 713/1 |
| 2008/0046708 | A1 * | 2/2008 | Fitzgerald et al. ................. 713/2 |
| 2008/0155245 | A1 * | 6/2008 | Lipscombe et al. .............. 713/2 |
| 2008/0168264 | A1 * | 7/2008 | Sebastian et al. ................. 713/1 |
| 2008/0172341 | A1 * | 7/2008 | Crandell .......................... 705/75 |
| 2009/0049442 | A1 * | 2/2009 | Shimasaki ..................... 717/174 |
| 2011/0119434 | A1 * | 5/2011 | Brown .......................... 711/103 |

OTHER PUBLICATIONS http://en.wikipedia.org/wiki/Diskless_node "Diskless node" 6 pages, Dated May 24, 2009.*
http://technet.microsoft.com/en-us/library/bb680684.aspx, "How to Disable a Software Update Deployment", 2 pages, Feb. 21, 2007.*

(Continued)

*Primary Examiner* — Jaweed A Abbaszadeh
*Assistant Examiner* — Phil Nguyen
(74) *Attorney, Agent, or Firm* — Brooks, Cameron & Huebsch, PLLC

(57) ABSTRACT

Methods, computer-readable media, and systems are provided for managing a target computing device. One method for managing the target computing device includes loading a service operating system into non-persistent memory of the target computing device having a persistent memory that is initially devoid of a functional operating system. The service operating system includes an embedded global shell agent. The global shell agent is executed thereby configuring the target computing device for remote management within an interactive command shell function before loading an operating system into persistent memory of the target computing device. The global shell agent is operable to examine and modify filesystems on the target computing device.

18 Claims, 2 Drawing Sheets

(56) References Cited

OTHER PUBLICATIONS http://wentzwu.com/TechNotes/DNS_Dynamic_Update.htm, "How to Enable/Disable Windows 2000 Dynamic DNS Registrations", 9 pages, Aug. 2, 2001.*

"Server Automation 7 Fundamentals, Instructor-Led Training", http://h41156.www4.hp.com/education/upload/de/de/merc_SAS70FUN_descr.pdf. Accessed Mar. 5, 2010. 4 pgs.

* cited by examiner

MANAGING A TARGET COMPUTING DEVICE

BACKGROUND

In a computing device, such as a server, router, computer, laptop, PDA, mobile phone, netbook, etc., and other devices having processor logic and memory, the computing device can have an operating system installed thereon, and may further include a number of application programs that execute on the computing device. However, after manufacture and/or assembly, the operating system and application programs first have to be loaded onto the computing device. A computing device with no functional operating system is referred to as a bare metal computing device. For example, a computing device configured as server hardware without a functional operating system is referred to as a bare metal server.

However, a bare metal computing device can have firmware, such as basic input/output system (BIOS) functions that functions to identify, test, and initialize system devices such as displays, drives, peripherals, and other hardware. The BIOS sets the machine hardware into a known state, so that software can be loaded and executed. Operating systems supersede the BIOS firmware functionality to provide replacement software interfaces to applications.

Computing systems can include multiple computing devices, which may be communicatively coupled over a communication network. The computing devices may, from time to time, be managed. For example, managing a computing device can include loading an operating system and/or application programs. The computing device may subsequently be further managed, such as to upgrade, replace, or troubleshoot the operating system and/or application programs; add, remove, or modify access rights; add/remove additional application programs; or examine and modify filesystems, execute commands, and/or perform other hardware, software, or operational manipulations.

Each computing device can be individually managed locally. However, an enterprise may have one or more computing systems, each comprising one or more computing devices. For example, an enterprise may have thousands of computing devices to manage, some portion of which may be communicatively coupled to a communication network, such as a local area network, wide area network, intranet, Internet, or other network. Managing large quantities of computing devices individually (e.g., locally) can be time consuming, expensive, and yield inconsistent results.

A server automation system may be used to manage a number of servers, including virtual servers, one at a time or as a group. A server automation system can include a server automation software core and a number of remote server automation remote software agents. Server automation systems can be used to manage servers using distributed scripts, manage software using policies, manage (e.g., install and uninstall) packages and patches, manage system and application configuration files, manage server compliance through automation and remediation features, and run reports, etc. The server automation software core may be in communication with the number of remote server automation remote software agents over a network.

One tool for managing multiple computing devices remotely and collectively is by an interactive command shell environment (e.g., a global shell). An interactive command shell can be an application loaded, and run, on top of an operating system installed in persistent memory. However, working with bare metal computing devices, which by definition do not yet having an operating system installed on persistent memory, presents a unique challenge. While bare metal computing devices can have an operating system and application programs locally loaded individually onto the persistent memory of a computing device, and thereafter can be managed remotely and collectively, an enterprise that is routinely provisioning large quantities of bare metal computing devices (e.g., a business replacing and/or adding new computing devices) faces with an expensive and time-consuming task in provisioning multiple bare metal computing devices.

DETAILED DESCRIPTION

Methods, computer-readable media, and systems are provided for managing a target computing device. One method for managing the target computing device includes loading a service operating system into non-persistent memory of the target computing device that is initially devoid of a functional operating system. The service operating system includes a global shell agent with bootstrapping capability embedded therein. The global shell agent is executed making the target computing device available for remote management within an interactive command shell function following completion of loading the service operating system and before loading an operating system into persistent memory of the target computing device. The interactive command shell function includes a capability to examine and modify filesystems via the global shell agent that the target computing device may have available.

It can be difficult to manage one or more computing devices that lack a functioning operating system installed in persistent memory. A computing device may lack a functioning operating system because no operating system has yet been installed in persistent memory, or because an installed operating system is malfunctioning. One previous approach to managing one or more computing devices that lack a functioning operating system is to use locally-managed, special purpose operating system images and local software tools on non-functioning computing devices, including bare metal computing devices, one at a time.

Therefore, an ability to manage computing devices remotely (e.g., via the communication network) and/or as a group (e.g., more than one computing device simultaneously) is desirable. According to one or more embodiments of the present disclosure, a computing device without an operating system installed on persistent memory (e.g., bare metal computing device) can be booted into a service operating system image in non-persistent memory containing a server automation agent capable of making the computing device fully manageable via a server automation global shell.

Figure 1:
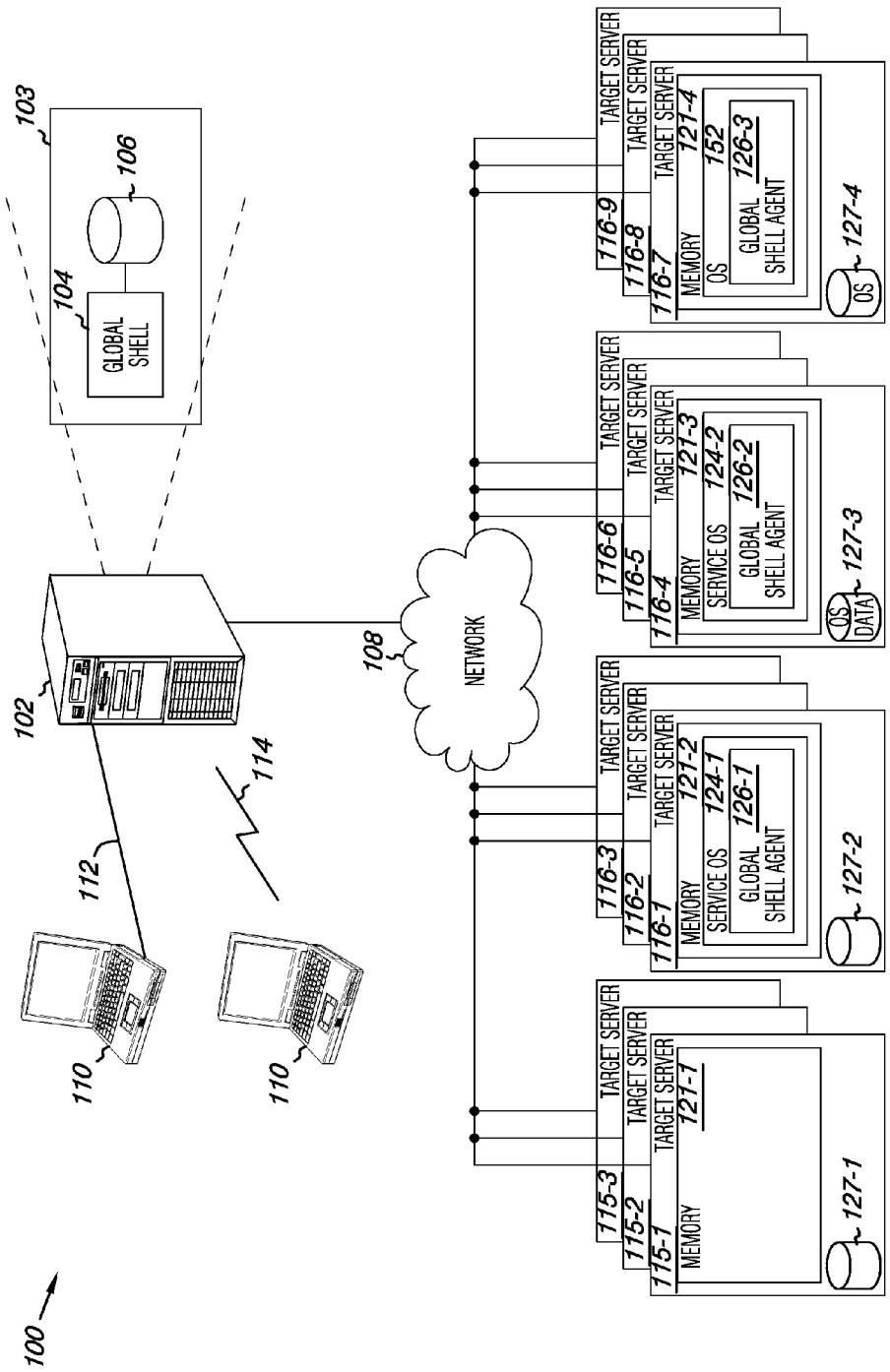
FIG. 1 is a block diagram of a computing system suitable to implement one or more embodiments of the present disclosure.

FIG. 1 is a block diagram of a computing system suitable to implement one or more embodiments of the present disclosure. While FIG. 1 is described with respect to a computing system comprising servers, embodiments of the present invention are not so limited. It will be understood that the following discussion is applicable to computing systems comprising additional and/or other types of computing devices as well.

The computing system 100 shown in FIG. 1 includes a server automation core management server 102. Server 102 has central management software 103 executing on one or more processors. The central management software 103 includes a server automation global shell 104 (e.g., software such as HEWLETT PACKARD OPSWARE GLOBAL FILE SYSTEM™ and a database 106 can be communicatively coupled to the server automation global shell 104. Database 106 may store information, such as hardware and software information relating individually and collectively to one or more target servers being managed by the central management software 103. While a single server 102 is shown for simplicity, embodiments of the present disclosure are not so limited, and the central management software may be running on one or more core management servers.

One or more client computing devices 110 may be communicatively coupled to the server automation core management server 102 via a hard-wired 112 or wireless 114 data communication path. End users can interface with the server automation core management server 102 and central management software 103 through the one or more clients 110.

The server automation core management server 102 is further communicatively coupled to a number of target servers through a communication network 108. Communication network 108 may a local area network, wide area network, intranet, Internet, other network arrangement, or a combination of network arrangements, including hard-wired and/or wireless portions thereof.

FIG. 1 shows target servers in four example configurations being communicatively coupled to communication network 108, however embodiments of the present disclosure are not so limited, and the computing system 100 may include more, or fewer, target servers having the configurations shown, or with other configurations. While a target server is shown in FIG. 1 as a single entity, a target server may comprise one or more individual computing devices and other hardware.

Target servers 115-1, 115-2, and 115-3 are initially devoid of a functional operating system in persistent, or non-persistent, memory (e.g., bare metal servers). Target servers 115-1, 115-2, and 115-3 are communicatively coupled to the communication network 108. As shown for target server 115-1, and applicable to each of the other bare metal target servers 115-2 and 115-3, target server 115-1 includes a memory 121-1 and persistent memory 127-1. Memory 121-1 may be non-persistent memory such as random access memory (RAM) for example. Persistent memory 127-1 may be a computer readable medium, such as a hard drive and/or solid state drive (e.g., flash, phase change, etc.), among others. Memory 121-1 is shown being empty (e.g., not containing a service operating system, operating system, global shell agent, etc.), and persistent memory 127-1 is also initially devoid of an operating system and/or applications (e.g., not containing an operating system or operating system data).

Target servers 116-1, 116-2, and 116-3 are distinguished from target servers 115-1, 115-2, and 115-3, in that target servers 116-1, 116-2, and 116-3 have been provisioned with a service operating system (SOS) into non-persistent memory. Target servers 116-1, 116-2, and 116-3 are communicatively coupled to the server automation core management server 102 via the communication network 108. Target servers 116-1, 116-2, and 116-3 are managed servers, being managed by the central management software 103 via the global shell 104. As shown for target server 116-1, and applicable to each of the other target servers 116-2 and 116-3, target server 116-1 includes a memory 121-2 and persistent memory 127-2. Memory 121-2 may be non-persistent memory, such as RAM. Memory 121-2 is analogous to memory 121-1, except that memory 121-2 has been programmed with instructions executable by one or more processors (not shown for each server) implementing a service operating system (SOS) 124-1 and a global shell agent 126-1.

Persistent memory 127-2 is analogous to persistent memory 127-1, and may be a computer readable medium, such as a hard drive and/or solid state drive (e.g., flash, phase change, etc.), among others. Persistent memory 127-2 is illustrated as still not yet being provisioned (e.g., not containing an operating system or operating system data). The computer readable medium may be a hard drive and/or solid state drive (e.g., flash, phase change, etc.).

Target servers 116-4, 116-5, and 116-6 are distinguished from target servers 116-1, 116-2, and 116-3, in that target servers 116-4, 116-5, and 116-6 are provisioned with operating system data stored in persistent memory. Target servers 116-4, 116-5, and 116-6 are also managed servers communicatively coupled to the server automation core management server 102 via the communication network 108. That is, target servers 116-4, 116-5, and 116-6 are managed servers, being managed by the central management software 103 via the global shell 104. As shown for target server 116-4, and applicable to each of the other target servers 116-5 and 116-6, target server 116-4 includes a memory 121-3 and persistent memory 127-3. Memory 121-3 may be non-persistent (e.g., RAM) memory. Memory 121-3 is analogous to memory 121-2.

Persistent memory 127-3 may be a computer readable medium such as a hard drive and/or solid state drive (e.g., flash, phase change, etc.). Persistent memory 127-3 is analogous to persistent memory 127-2, except that persistent memory 127-3 has been provisioned with instructions executable by one or more processors so as to contain operating system data.

Target servers 116-7, 116-8, and 116-9 are distinguished from target servers 116-4, 116-5, and 116-6, in that target servers 116-7, 116-8, and 116-9 are provisioned with an operating system stored in persistent memory. Target servers 116-7, 116-8, and 116-9 are also managed servers communicatively coupled to the server automation core management server 102 via the communication network 108. That is, target servers 116-7, 116-8, and 116-9 are being managed by the central management software 103 via the global shell 104. As shown for target server 116-7, and applicable to each of the other target servers 116-8 and 116-9, target server 116-7 includes a memory 121-4 and persistent memory 127-4. Memory 121-4 may be non-persistent (e.g., RAM) memory. Memory 121-4 is analogous to memory 121-3, except that memory 121-4 has been programmed with instructions executable by one or more processors (not shown for each server) implementing an operating system (OS).

Persistent memory 127-4 may be a computer readable medium such as a hard drive and/or solid state drive (e.g., flash, phase change, etc.). Persistent memory 127-4 is analogous to persistent memory 127-3, except that persistent memory 127-4 has been provisioned with instructions executable by one or more processors so as to store an operating system (OS) 152, and a global shell agent 126-3. Persistent memory 127-4 is shown being programmed with instructions executable by one or more processors so as to contain a fully-functional operating system, including the operating system data. It will be understood that the OS 152 is running from persistent memory 127-4, with operating system instructions being loaded into memory 121-4 for execution thereof.

According to one or more embodiments of the present disclosure, target servers 115-1, 115-2, and 115-3, initially devoid of a functional operating system (e.g., bare metal servers), can be made available for remote management, along with other target servers within the interactive global shell 104 after loading a service operating system thereon. That is, target servers 115-1, 115-2, and 115-3 can be managed along with target servers 116-1, 116-2, 116-3, 116-4, 116-5, 116-6, 116-7, 116-8, and 116-9 after loading a service operating system into non-persistent memory including a global shell agent embedded therein, but prior to completion of loading the operating system into persistent memory.

The global shell 104 is an interactive command shell environment that can be used to access aspects of the managed target servers, including server automation database metadata associated with a particular one or more servers (e.g., stored in database 106), filesystems, and commands that execute remotely on the managed server. The global shell agent runs locally on a managed computing device's SOS or OS, and communicates interactively with the central management software 103 running on the server automation core management server 102.

According to a previous approach to configuring a bare metal computing device, a SOS was first loaded onto the bare metal computing device. A SOS is distinguished from a (full) OS, in part, because it is stored in and executed from non-persistent memory. In contrast, an OS is typically stored in persistent memory (which may include persistent memory external to the computing device), portions of which may be loaded into non-persistent memory for execution. One commercially available SOS is WINDOWS PREINSTALLATION ENVIRONMENT (WinPE) available from MICROSOFT. SOSs corresponding to other hardware and operating system platforms (e.g., LINUX, SOLARIS, among others) are also commercially available. An SOS can be loaded onto a bare metal computing device, for example, by locally or remotely booting an SOS image into the non-persistent memory (e.g., 121-1, 121-2, etc.) of the computing device.

According to previous approaches, after an SOS is loaded into non-persistent memory of the computing device and is operational to provide limited functionality to the target computing device, a minimally-functional (e.g., skeleton) global shell agent is thereafter loaded into the non-persistent memory of the computing device. The minimally-functional global shell agent is distinguishable from a global shell agent in that the minimally-functional global shell agent has significantly reduced functionality from that of the global shell agent. That is, the minimally-functional global shell agent is not capable of performing certain functions directly (e.g., without additional customized auxiliary programming), such as reading files, writing files and running commands through the minimally-functional global shell agent.

According to previous approaches, a minimally-functional global shell agent was loaded rather than a fully-functional global shell agent because the fully-functional global shell agent is typically configured to included operations that assume functionality provided by the underlying operating system were available. Because a service operating system does not include all the functionality of an operating system (e.g., production operating system), global shell agents operating on top of service operating systems were provided only minimal functionality corresponding to the reduced capabilities of the service operating system with respect to the capabilities of an operating system (e.g., production operating system loaded into persistent memory). That is, because the functionality of the service operating system was reduced as compared to a fully-functional operating system, the functionality of a minimally-functional global shell agent running on top of a service operating system had to be at least correspondingly reduced as compared to the functionality of a global shell agent running on top of a fully-functional operating system.

File reading, file writing and/or command execution capabilities are not inherently available via a minimally-functional global shell agent. Previous approaches augmented the limited functionality of a minimally-functional global shell agent through additional computer programming installed after the minimally-functional global shell agent was operational. The additional programming was often customized to particular hardware configurations, and frequently written in obscure programming languages, that is, obscure to computer system administrators (as distinguished from those skilled in the computer programming arts). Thus, according to previous approaches, computing systems that included bare metal computer devices were not manageable within a global shell to the same extent as other resources without further programming by those having specialized programming skills. Often, the bare metal computing devices were segregated from the global shell used to manage fully provisioned computing devices (e.g., with an operating system installed in persistent memory having a global shell agent running thereon).

According to one or more embodiments of the present disclosure, a global shell agent is embedded into a SOS. The global shell agent of the present disclosure is an application loaded on top of the service operating system after the service operating system is fully loaded and initialized. That is, SOS images are configured to include a global shell agent adapted for execution following completion of loading of the SOS. The global shell agent according to the present disclosure is operable to read files, write files, and/or remotely execute commands without further customized programming to provide such capabilities.

According to one or more embodiments of the present disclosure, a global shell agent has interactive command shell capabilities that are easy to use by those having experience with global shell administration of computing devices. That is, the capabilities of the global shell agent of the present disclosure exceeds the minimal functionality provided by prior approaches (e.g., a skeleton global shell agent). According to one or more embodiments of the present disclosure, a global shell agent provides capabilities comparable to those of a global shell agent loaded after installation of the operating system onto persistent memory (e.g., a production operating system), including read and writing filesystems that may be available on a target computing system, and running commands via the global shell agent on the target computing system. According to one or more embodiments, the global shell agent provides full global shell functionality (e.g., functionality equivalent to a global shell agent operating on top of an operating system onto persistent memory (e.g., a production operating system).

According to one or more embodiments, the global shell agent is embedded in the service operating system, and is loaded concurrently into non-persistent memory. The global shell agent of the present disclosure provides file reading, file writing, and command running capabilities via the global shell agent executing in conjunction with the service operating system without additional customized programming provided after the global shell agent is loaded. In this manner, the global shell agent of the present disclosure is made useful to system administrators without any specialized computer programming expertise.

According to one or more embodiments of the present disclosure, the global shell agent is modified for operation on top of a SOS. Modifications to the global shell agent to enable functionality following completion of loading the SOS includes, but is not limited to: embedding bootstrapping capability in the global shell agent; disabling periodic inventory collection and registration of installed software packages since bare metal computing devices have no installed software packages; disabling periodic inventory collection and registration of installed patches since bare metal computing devices have no installed patches; preventing the computing device name in the server automation database (e.g., 106) from being updated if the computing device already has a computing device name for the target computing device entered manually or previously generated by an OS to prevent a subsequently SOS-generated random unique meaningless computing device name from replacing an intended computing device name; adding logic to properly match a given target server uniquely to a corresponding database record to supplement global shell agent logic that looks for an on-disk (e.g., drive) identifier to be present since bare metal computing devices have blank drives; adding logic for tracking target computing devices as they are configured from bare metal to enable providing a distinct visual indication at a user interface (e.g., client 110); disabling computing device automation jobs (e.g., install selected software inappropriate to bare metal computing devices and computing devices not yet configured to receive same, install patches, snapshot filesystems, etc.) that do not apply to bare metal computing devices, and computing devices that do not have an OS installed; and disabling other computing device management operations that are not applicable to bare metal computing devices and/or a computing device operating under an SOS, and/or are not efficient as applied to bare metal computing devices and/or a computing device operating under an SOS.

According to one or more embodiments of the present disclosure, SOS images containing the integral global shell agent can network boot via Preboot eXecution Environment (PXE) network booting, via bootable computer-readable medium (e.g., CD-ROM, removable disk, portable memory, etc.) images, or other bootable method. Once the global shell agent is loaded onto a target bare metal computing device, the global shell agent collects a hardware and/or memory inventory from the target computing device and reports this information back to the server automation core management server 102. For example, the global shell agent collects basic processor information such as number of processors and speed, available memory, number and capacity of installed disks, and details of installed network interface cards. A record in the server automation database 106 is created to represent the associated target computing device, and the target computing device is then made available for management within the global shell 104 feature. The global shell agent does not collect a software inventory from the target computing device, since bare metal computing devices, by definition, do not have any software loaded.

Once a target server is available (e.g., visible), it becomes a managed computing device. Thus, an ability to examine and modify (assuming appropriate permissions) any filesystems that become available on the target computing device is realized. Additionally, an interactive shell session can be initiated on the target computing device remotely using a "rosh" (or other similar) command program, for example. This provides an administrative shell with respect to the target computing device in the process of being provisioned with an OS. Individual remote commands can be issued using the "rosh" program to the target computing device, with the output being displayed in response.

The reader will appreciate that being able to manage a bare metal computing device in conjunction with an SOS facilitates additional troubleshooting capabilities versus a minimally-functional global shell agent of previous approaches. Once the SOS is loaded, the SOS along with the global shell of the present disclosure can be further utilized to install the OS, configure the target computing device, run scripts, and install applications and patches. The global shell agent, loaded only into and operating from non-persistent memory, can also be used to repair an OS rather than re-installing the OS. The global shell agent can be used to create new passwords in response to a lost password and/or to repair a corrupted file (e.g., of an OS). The global shell agent allows access and modification of available tunable and other parameters. The global shell agent allows interacting with the hardware of the target server, such as to upgrade firmware, configure disks (e.g., configure RAID technology), and perform troubleshooting thereof.

The global shell agent, loaded into and operating only from non-persistent memory, is operable to enable remote management of a particular target computing device, and allows managing multiple target computing devices, including computing devices that do not yet have an operating system installed in persistent memory, using a common (e.g., single) command line as if the multiple computing devices were a single computing device. The reader will appreciate that the present disclosure, by extending these management capabilities to bare metal computing devices, provides improved efficiency in the process of configuring bare metal computing devices akin to those capabilities previously limited to target computing devices with a functional OS.

One advantage to the capabilities provided by the methods and systems of the present disclosure that enable use of the global shell feature before operation of an OS so that target computing devices can be managed sooner in their provisioning process, along with fully managed computing devices (e.g., computing devices having an operating system installed in persistent memory with a global shell agent application loaded into persistent memory and running on top of the operating system). Thus, a platform that can handle computing devices having a service operating system, as well as computing devices having functional operating systems, provides a consistent computing device automation platform for managing the entire computing system.

Figure 2:
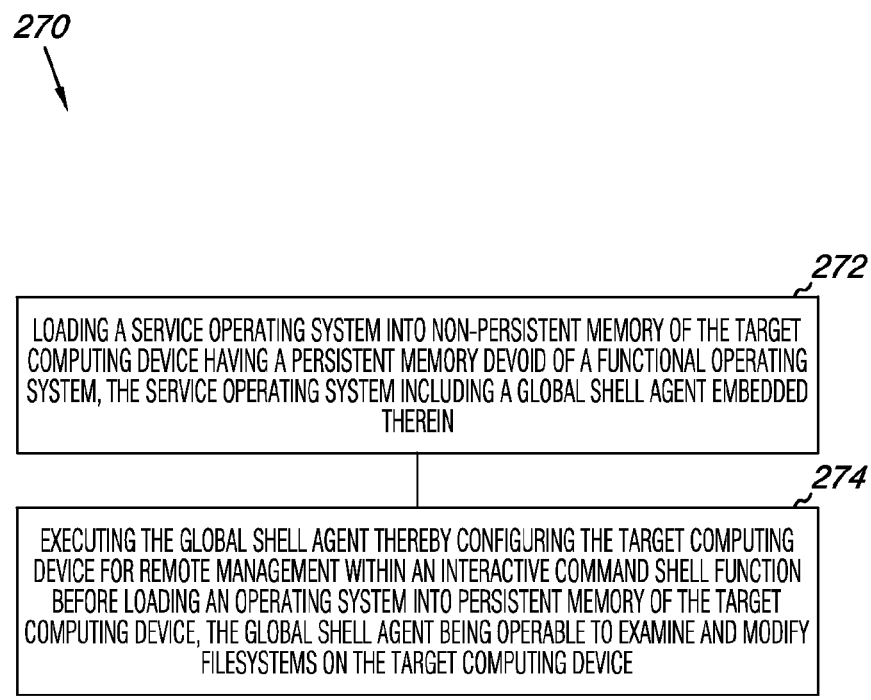
FIG. 2 is a flow chart illustrating a method for managing a target computing device according to one or more embodiments of the present disclosure.

FIG. 2 shows a flow chart 270 illustrating a method for managing a computing device according to one or more embodiments of the present disclosure. The method includes loading a service operating system into non-persistent memory of the target computing device that is initially devoid of a functional operating system, the service operating system including a global shell agent embedded therein at 272. The global shell agent is executed at 274, thereby configuring the target computing device for remote management within an interactive command shell function before loading an operating system into persistent memory of the target computing device. The global shell agent is operable to examine and modify filesystems on the target computing device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for managing a target computing device, comprising:
    loading, over a communication network from a remote location, a service operating system into non-persistent memory of the target computing device having a persistent memory that is devoid of the service operating system and is devoid of a functional operating system, the service operating system including a global shell agent embedded therein; and
    executing the global shell agent thereby configuring the target computing device for remote management within an interactive command shell function before loading an operating system into persistent memory of the target computing device,
    wherein the global shell agent is operable to examine and modify filesystems on the target computing device, and
    wherein the global shell agent is operable to refrain from periodically collecting and registering an inventory of installed patches until after the functional operating system is stored in persistent memory of the target computing device.

2. The method of claim 1, further comprising loading the service operating system onto the non-persistent memory of the target computing device from a remote location and over a communication network.

3. The method of claim 2, further comprising executing the global shell agent thereby configuring the target computing device for remote management in the global shell collectively with other managed computing devices having a functional operating system installed in persistent memory therein.

4. The method of claim 3, further comprising booting service operating system images onto the target computing device via preboot execution environment network booting, the service operating system images including the global shell agent.

5. The method of claim 1, further comprising:
    collecting an inventory from the target computing device by the global shell agent that includes hardware and excludes software; and
    providing the inventory to a record in a computing device automation database representative of the target computing device.

6. The method of claim 1, wherein the global shell agent is operable to initiate commands remotely that execute locally on the target computing device.

7. The method of claim 1, wherein the global shell agent is imbedded in the service operating system and loaded into non-persistent memory of the target computing device concurrently with the service operating system.

8. The method of claim 1, further comprising modifying the global shell agent to disable a periodic inventory collection and a registration of installed software packages and patches.

9. The method of claim 1, wherein the global shell agent is operable to refrain from periodically collecting and registering an inventory of installed software and patches.

10. The method of claim 1, wherein the global shell agent is operable to refrain from periodically collecting and registering an inventory of installed software until after a functional operating system is stored in persistent memory of the target computing device.

11. The method of claim 1, wherein the global shell agent is operable to refrain from periodically collecting and registering an inventory of installed patches until after a functional operating system is stored in persistent memory of the target computing device.

12. A non-transitory computer-readable medium comprising computer-readable instructions to manage a target computing device, the computer-readable instructions comprising instructions for:
    loading, over a communication network from a remote location, a service operating system into non-persistent memory of the target computing device having a persistent memory that is devoid of the service operating system and is devoid of a functional operating system, the service operating system including a global shell agent embedded therein; and
    executing the global shell agent thereby configuring the target computing device for remote management within an interactive command shell function before loading an operating system into persistent memory of the target computing device,
    wherein the global shell agent is operable to examine and modify filesystems on the target computing device, and
    wherein the global shell agent is operable to refrain from periodically collecting and registering an inventory of installed patches until after the functional operating system is stored in persistent memory of the target computing device.

13. The non-transitory computer-readable medium of claim 12, further comprising computer-readable instructions for configuring the target computing device for remote management in the global shell collectively with other managed computing devices having a functional operating system installed in persistent memory therein.

14. The non-transitory computer-readable medium of claim 12, further comprising computer-readable instructions for booting service operating system images onto the target computing device via preboot execution environment network booting, the service operating system images including the global shell agent.

15. The non-transitory computer-readable medium of claim 12, further comprising computer-readable instructions for:
    collecting an inventory from the target computing device by the global shell agent that includes hardware and excludes software; and
    providing the inventory to a record in a computing device automation database representative of the target computing device; and
    receiving, to the global shell agent, commands initiated remotely and executing the commands locally on the target computing device.

16. A system for managing a target computing device, the system comprising:

one or more managed computing devices each having a functional operating system installed into persistent memory;

a target computing device having persistent memory that is devoid of a service operating system and is devoid of a functional operating system; and a central management computing device programmed with computer-readable instructions executing on one or more processors to:

load, over a communication network from a remote location, a service operating system into non-persistent memory of the target computing device, the service operating system including a global shell agent embedded therein; and execute the global shell agent thereby configuring the target computing device for remote management within an interactive command shell function before loading an operating system into persistent memory of the target computing device, wherein the global shell agent is operable to examine and modify filesystems on the target computing device, and wherein the global shell agent is operable to refrain from periodically collecting and registering an inventory of installed patches until after the functional operating system is stored in persistent memory of the target computing device.

17. The system of claim 16, wherein the global shell agent is operable to initiate commands remotely that execute locally on the target computing device.

18. The system of claim 17, wherein the global shell agent is operable to configure the target computing device to be collectively operated as a group with one or more other managed computing devices having a functional operating system installed in persistent memory.

* * * * *